(12) United States Patent
Najand (10) Patent No.: US 7,203,379 B1
(45) Date of Patent: Apr. 10, 2007

(54) DIGITAL IMAGE CROSS TALK CORRECTION

(75) Inventor: Shahriar Najand, Costa Mesa, CA (US)

(73) Assignee: ESS Technology, Inc., Fremont, CA (US)

( * ) Notice: Subject to any disclaimer, the term of this patent is extended or adjusted under 35 U.S.C. 154(b) by 774 days.

(21) Appl. No.: 09/677,227

(22) Filed: Sep. 29, 2000

(51) Int. Cl.
*G06K 9/40* (2006.01)

(52) U.S. Cl. .................. 382/275; 382/205
(58) Field of Classification Search ............. 382/205, 382/275
See application file for complete search history.

(56) References Cited

U.S. PATENT DOCUMENTS 5,493,553 A * 2/1996 Maurice et al. ........ 369/109.01
5,572,603 A * 11/1996 Koike ........................ 382/199

* cited by examiner

*Primary Examiner*—Bhavesh M. Mehta
*Assistant Examiner*—Patrick L. Edwards
(74) *Attorney, Agent, or Firm*—Farjami & Farjami LLP (57) ABSTRACT

An image processing system comprises a processing circuitry operable to receive a digital image and a line buffer circuitry communicatively coupled to the processing circuitry, the line buffer circuitry comprising a plurality of line buffers. The processing circuitry performs cross talk correction on a first pixel during a first pass to generate a first cross talk corrected pixel, wherein said first pixel is received from a first line buffer of the plurality of line buffers. During the first pass, the processing circuitry further stores the first cross talk corrected pixel in the line buffer circuitry, retrieves the first cross talk corrected pixel from the line buffer circuitry, and uses the first cross talk corrected pixel to perform cross talk correction on a second pixel to generate a second cross talk corrected pixel, wherein the second pixel is received from a second line buffer of the plurality of line buffers.

9 Claims, 11 Drawing Sheets

Image 407

DIGITAL IMAGE CROSS TALK CORRECTION

BACKGROUND OF THE INVENTION

1. Technical Field

The invention relates to image processing and, more particularly, to cross talk correction within digital image processing schemes.

2. Related Art

Many conventional methods that are geared to perform cross talk correction within digital image processing schemes commonly employ a single pass method over the entire digital image that inherently does not provide a high degree of accuracy. The cross talk correction often does not converge in a highly accurate manner, given the use of only a single iteration of cross talk correction. Those conventional methods that seek to employ multi-pass cross talk correction commonly employ a frame buffer for intermediate data storage. This manner of performing cross talk correction in a multi-pass technique is radically expensive in terms of memory requirements. That is to say, the entire image needs to be stored as an intermediary to perform a multi-pass technique. For example, a single image can contain over] million bytes of memory for a SXGA image. These processing requirements commonly lead design engineers to generate cross talk correction methods that provide less than full correction. Given the enormous memory requirements, designers are often bound to solutions that do not provide full cross talk correction, at least not to convergence of whatever correction method is employed, within image data processing systems that do not have extremely large hardware budget.

In addition to those methods that inherently require enormous memory requirements, other conventional methods have sought to perform cross talk correction in a predetermined sequence. For example, in an RGB (red, green, blue) image, the red or R pixels are corrected first, the green or G pixels are corrected next, and finally the blue or B pixels are corrected. However, some of the deficiencies include significant irregularities and uneven distribution over all of the pixel colors within the image. A large amount of image processing is performed on some of the pixels within the digital image, while little to no image processing is performed on other pixels within the same digital image. These irregularities commonly result in high cost and difficulty in implementation in hardware. The amount of redesigning and debugging required to accommodate all of the various and different digital image types may be enormous. For example, to accommodate one digital image type, the designer must specifically design a method adaptable to that image type. Similarly, to accommodate another digital image type, the designer must specifically design another method adaptable to that image type. There simply lacks the ability to adapt such a conventional method universally to different types of digital images For a clearer understanding of the problem associated with cross talk, the following illustration is provided showing the diffusion of light from one pixel into its neighbors. Cross talk between neighboring pixels in a digital image occurs when a beam of light aimed for a pixel diffuses into its neighboring pixels and corrupts their values. Using the following image pattern for illustration, when light is aimed at pixel B1, a majority of the light aimed at the pixel may in fact be captured by the pixel B1.

| Line 1 | R1m G1m R2m G2m ... |
| Line 2 | G3m B1m G4m B2m ... |
| Line 3 | R3m G5m R4m G6m ... |
| Line 4 | G7m B3m G8m B4m ... |
| ... | ... |

As mentioned above, there simply does not exist a highly efficient method to perform digital image processing that reduces the undesirable cross talk diffusion between neighboring pixels. The image captured inherently contains the embedded cross talk resulting from the imperfections within the image sensor itself, in that, the pixels of adjacent pixels are not perfectly isolated from one another. Further limitations and disadvantages of conventional and traditional systems will become apparent to one of skill in the art through comparison of such systems with the invention as set forth in the remainder of the present application with reference to the drawings.

| Line 1 | R1 G1 R2 G2 ... |
| Line 2 | G3 B1 G4 B2 ... |
| Line 3 | R3 G5 R4 G6 ... |
| Line 4 | G7 B3 G8 B4 ... |
| ... | ... |

However, some of the light escapes into the neighboring pixels R1, G1, R2, G3, G4, R3, G5, and R4. This undesirable diffusion is color dependent and can be modeled by the following equations for each pixel color:

$$B1m = b1*B1 + b2*G1 + b3*G5 + b4*G3 + b5*G4 + b6*R1 + b7*R2 + b8*R3 + b9*R4$$

$$R4m = r1*R4 + r2*G4 + r3*G5 + r4*G6 + r5*G8 + r6*B1 + r7*B2 + r8*B3 + r9*B4$$

$$G4m = g1*G4 + g2*G1 + g3*G2 + g4*G5 + g5*G6 + g6*B1 + g7*B2 + g8*R2 + g9*R4$$

where the left hand side of the preceding equations are the cross talk corrupted pixel values and the coefficients preceding the pixel values on the right hand side (b1 ... b9, r1 ... r9, and g1 ... g9) represent the diffusion coefficients between the adjacent pixels. The actual values captured by the digital image sensor are corrupted and are represented as follows:

Line 1 R1m G1m R2m G2m ...

SUMMARY

Various aspects of the invention can be found in an image processing system operable to perform cross talk correction to a digital image having a plurality of pixels. The image processing system may include, among other things, an image sensor circuitry, a processing circuitry, and a line buffer circuitry. The image sensor circuitry typically operates to read an image and to generate a digital image. The processing circuitry is communicatively coupled to the image sensor circuitry, and the line buffer circuitry, that itself contains a number of line buffers that are communicatively coupled to the processing circuitry.

The processing circuitry performs cross talk correction on a first pixel contained within a first line of image data. The first line is received from a first line buffer contained within the line buffer circuitry. In addition, the processing circuitry uses a second pixel contained within a second line of image data to perform the cross talk correction on the first pixel. The second line is received from a second line buffer contained within the line buffer circuitry. Also, the processing circuitry receives a third line comprising a third plurality of pixels from the image sensor circuitry.

The processing circuitry may also perform cross talk correction on a third pixel contained within the third line of image data after performing cross talk correction on the first pixel. The processing circuitry uses a fourth pixel contained within a fourth line of image data to perform the cross talk correction on the first pixel to generate the first cross talk corrected pixel, the fourth line is received from a third line buffer contained within the line buffer circuitry. A portion of the second line and a portion of the fourth line are a cross talk correction grid. A predetermined trajectory aligns along the first pixel, the second pixel, and the third pixel within the image data. The processing circuitry is operable to perform multi-pass cross talk correction on a fourth pixel contained within a fourth line of image data that is received from a fourth line buffer contained within the line buffer circuitry. The first pixel, the second pixel, a third pixel within the third line of image data, and the fourth pixel are aligned along a predetermined trajectory within the digital image. The processing circuitry uses the first cross talk corrected pixel to perform multi-pass cross talk correction on the fourth pixel.

This invention may also apply to image processing systems performing cross talk correction to a digital image having a plurality of pixels. The image processing system may also include, a processing circuitry and a line buffer circuitry. The line buffer circuitry may be communicatively coupled to the processing circuitry. The circuitry performs cross talk correction on a first pixel contained within a first line of image data while the processing circuitry receives a second line of image data. The processing circuitry uses a second pixel contained within the second line of image data to perform the cross talk correction on the first pixel.

The processing circuitry receives a third line comprising a third plurality of pixels from the line buffer circuitry. The line buffer circuitry may include a line buffer, and the second line of image data is contained within the line buffer. The processing circuitry performs cross talk correction on the first pixel contained within the first line of image data while the processing circuitry performs multi-pass cross talk correction on a third pixel contained within a third line of image data while the processing circuitry receives the second line of image data from the line buffer circuitry. The first pixel and the third pixel may be aligned along a predetermined trajectory within the digital image. A portion of the second line and a portion of the fourth line are a cross talk correction grid. The processing circuitry uses the first cross talk corrected pixel to perform multi-pass cross talk correction on the third pixel. The processing circuitry uses a third pixel contained within a third line of image data to perform the cross talk correction on the first pixel. The line buffer circuitry comprises a first line buffer and a second line buffer, and the second line of image data is contained within the first line buffer, and the third line of image data is contained within the second line buffer.

Other aspects of the invention can be found in a method to perform cross talk correction to a digital image. The method includes, among other things, performing cross talk correction on a first pixel contained within a first line of image data to generate a first cross talk corrected pixel, receiving a second line of image data while performing the cross talk correction on the first pixel, and using a second pixel contained within the second line to perform the cross talk correction on the first pixel.

In certain embodiments of the invention, the method also includes using a third pixel contained within a third line of image data to perform the cross talk correction on the first pixel to generate the first cross talk corrected pixel. A portion of the second line and a portion of the third line are a cross talk correction grid. The method also includes performing multi-pass cross talk correction on a third pixel contained within a third line of image data using the first cross talk corrected pixel. The method also includes storing the first cross talk corrected pixel in a memory location. Also, the first pixel and the second pixel are aligned along a predetermined trajectory within the digital image.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Cross talk is an undesirable product of the imperfections in the fabrication of image sensor circuitries. This deleterious effect cannot be completely corrected or removed since a certain degree of information is lost in the image capturing process. Some aspects of this cross talk problem are similar to the problem of de-blurring a low-pass filtered image. However, a very good estimate of the actual image that is being captured is achieved by performing cross talk correction in accordance with the invention. For example, there is virtually no visually perceptual difference between the actual image and the cross talk corrected image resulting from the image processing of the invention.

To calculate, mathematically, the original (uncorrupted) pixels values of a digital image, the diffusion equations for the center pixel value are solved with the following resultant equation. The actual values captured by the digital image sensor are corrupted and are represented as follows:

| Line 1 | R1m G1m R2m G2m . . . |
| Line 2 | G3m B1m G4m B2m . . . |
| Line 3 | R3m G5m R4m G6m . . . |
| Line 4 | G7m B3m G8m B4m . . . |
| . . . | . . . |

However, the true value of the pixel B1 is shown below as a function of the measured cross talk corrupted value B1m itself and adjacent pixels.

$B1=(B1m-b2*G1-b3*G5-b4*G3-b5*G4-b6*R1-b7*R2-b8*R3-b9*R4)/b1$ $B1=b1m*B1m-b2m*G1-b3m*G5-b4m*G3-b5m*G4-b6m*R1-b7m*R2-b8m*R3-b9m*R4$

The measured coefficients preceding the pixel values on the right hand side (b1m, b2m, . . . b9m) represent the measured diffusion coefficients between the adjacent pixels, where b1m=1/b1, b2 m=b2/b1, . . . b9 m=b9/b1. The actual value of the pixel location B1 is unknown, given the imperfection of the image capture device itself (shown as an image sensor circuitry in the various embodiments of the invention following). However, recursive mathematics are employed to approximate the actual values as shown below. The right hand side of the equation (G1, G5, . . . ) is unknown, so those values are approximated and replaced with their measured and corrupted values as shown below.

$B1p=b1m*B1m-b2m*G1m-b3m*G5m-b4m*G3m-b5m*G4m-b6m*R1m-b7m*R2m-b8m*R3m-b9m*R4m$

B1p is partially cross talk corrected and is closer to the real value B1 than B1m is to B1. Continuing on, doing the same thing to all pixels in the image then we get a partially corrected image that is closer to the uncorrupted one. Since all the pixels were processed only once, this particular embodiment illustrates single pass cross talk correction. If desired, all of the partially corrected pixel values are stored in a frame buffer, then the cross talk correction is repeated indefinitely until convergence, or a predetermined number of times, to generate a higher quality Image. However, after two or more passes the cross talk correction converges and further passes will not improve or modify the image in any visually perceptual manner.

This single pass cross talk correction does not require a frame buffer at all. To correct a pixel, a predetermined number (N) of adjacent rows of the image are used. A number less than the predetermined number (N−1) of lines of the image are saved in line buffers since previous lines of the image are corrected as a current line comes in from an image sensor circuitry. For example, in the instance of using a 3×3 grid size to perform cross talk correction using the single pass solution, the amount of storage is only 2×1024=2048 pixels—a reduction in memory storage requirements when compared to conventional solutions that perform cross talk correction.

In addition, multi-pass implementations may be performed where certain pixels along a predetermined trajectory are cross talk corrected more than once during a single pass over the image. For example, in the single pass solution, partially cross talk corrected pixel values are sent to the next block for further processing or stored in a separate storage like a frame buffer in certain embodiments of the invention. However, these same partially cross talk corrected pixels are stored back to the line buffers as they are calculated and are used to perform cross talk correction on subsequent pixels, thereby giving even greater accuracy. This generates the following snapshot of the line buffers as pixel R4 comes in from the sensor when one predetermined trajectory is employed.

| Line buffer 1 | R1p G1p R2p G2p . . . |
| Line buffer 2 | G3p B1m G4m B2m . . . |
| Current Line from sensor | R3m G5m R4m |

R1p . . . G3p are the partially corrected values and B1m . . . R4m are the uncorrected values. The following equation results for B1.

$B1p=b1*B1m-b2*G1p-b3*G5-b4*G3p-b5*G4-b6*R1p-b7*R2p-b8*R3-b9*R4$

This above equation is a better partially corrected B1p since other partially corrected neighboring pixels are used in calculating the partially corrected value of B1p. Therefore, this "single pass" method is superior to the single pass solution discussed above, though it is not truly single pass, in that, the pixels in the image are being cross talk corrected multiple times during the one pass over the image. Continuing, by adding another line buffer, and when B4m comes in from the image sensor circuitry, the following snapshot results.

| Line buffer 1 | R1p G1p R2p G2p . . . |
| Line buffer 2 | G3p B1p G4p B2p . . . |
| Line buffer 3 | R3p G5p R4m G6m . . . |
| Current Line from sensor | G7m B3m G8m B4m |

At this point, R4m is partially cross talk corrected and stored as R4p in its place so the snapshot will change to the following when the next pixel G9m comes in from the image sensor circuitry.

| | |
|---|---|
| Line buffer 1 | R1p G1p R2p G2p . . . |
| Line buffer 2 | G3p B1p G4p B2p . . . |
| Line buffer 3 | R3p G5p R4p G6m . . . |
| Current Line from sensor | G7m B3m G8m B4m G9m |

In this specific embodiment, a complete 3×3 grid of partially corrected pixels (R1p, G1p, R2p, G3p, B1p, G4p, R3p, G5p, R4p) is generated. Furthermore, the accuracy of the value of B1p is increased by applying the cross talk correction equation to it. When this process is continued for all the pixels of the image, then a "second pass" is effectively performed over the entire image. Therefore, by adding a single line buffer to the image processing system, the capability of running a second pass over the image is provided without the use of an expensive frame buffer.

Similarly, additional line buffers are added in certain embodiments of the invention to help perform more "passes" over the image and the cross talk corrected quality of the image is improved even more. This cross talk correction generates high quality image for the same number of passes. It is substantially cheaper than conventional cross talk correction methods in many respects, one being that it uses less memory (e.g., a few line buffers of 1024 pixels each instead of a frame buffer of size 1.3 million pixels). This technique is extendable to grid sizes of any various size. For example, the above illustration shows a 3×3 diffusion model. However, bigger models (5×5 or bigger) are equally operable in accordance with the invention.

Figure 1:
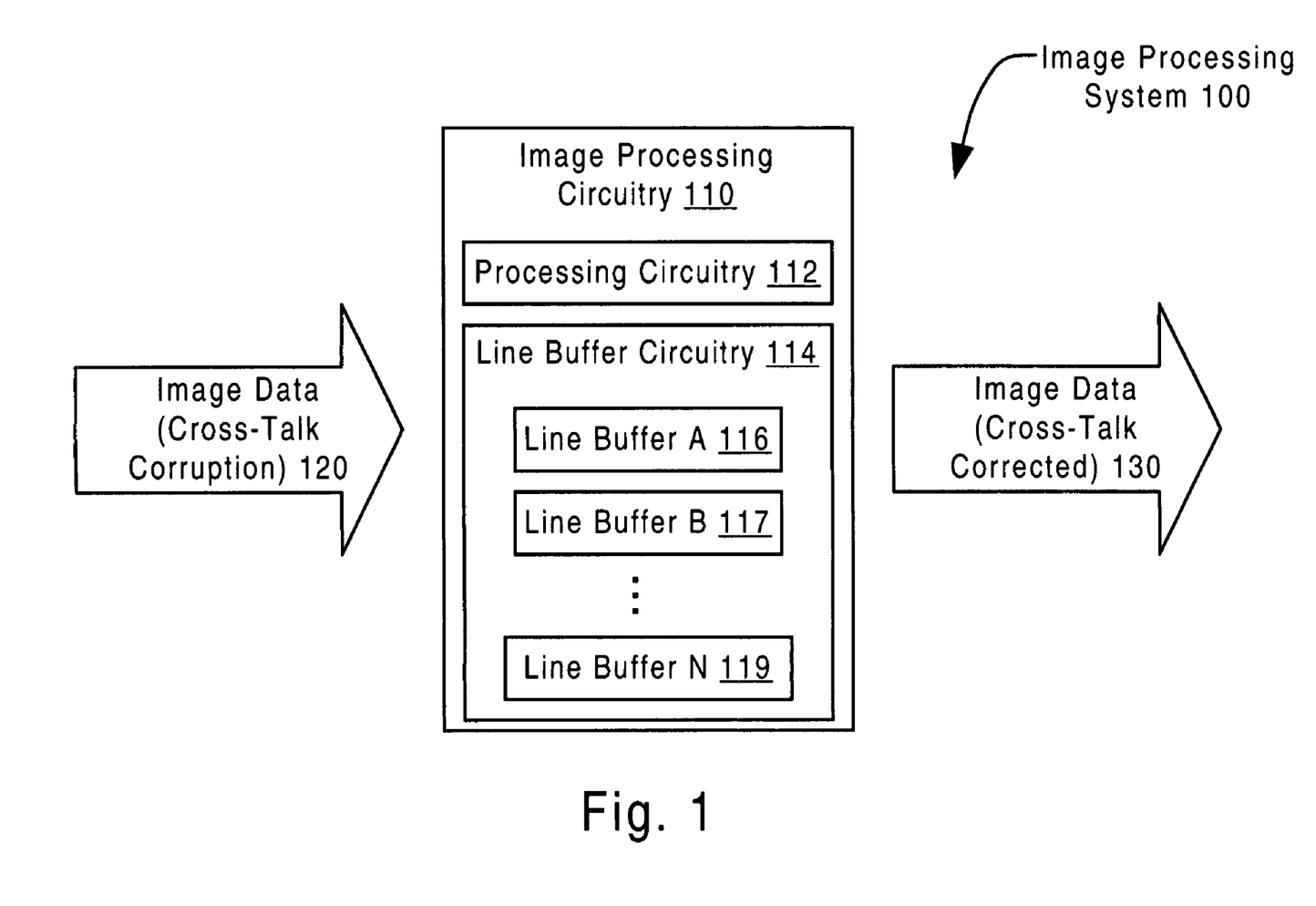
FIG. 1 is a system diagram illustrating an embodiment of an image processing system.

FIG. 1 is a system diagram illustrating an embodiment of an image processing system 100 having a processing circuitry 112 and a line buffer circuitry 114. The line buffer circuitry may have an indefinite number of line buffers illustrated as a line buffer A 116, a line buffer B 117, and a line buffer N 119. Input, cross talk corrupted image data 120 is fed into the image processing circuitry 110. The processing circuitry 112 may be operable to perform cross talk correction using any of the embodiments including single or multi-pass cross talk correction and the use of variable grid sizes for cross talk correction when performing image processing on the cross talk corrupted image data 120. The resultant output from the image processing circuitry 110 is an output, cross talk corrected image data 130. This image data is operable to be stored, transmitted or displayed as will be shown in the various embodiments of the invention below.

Figure 2A:
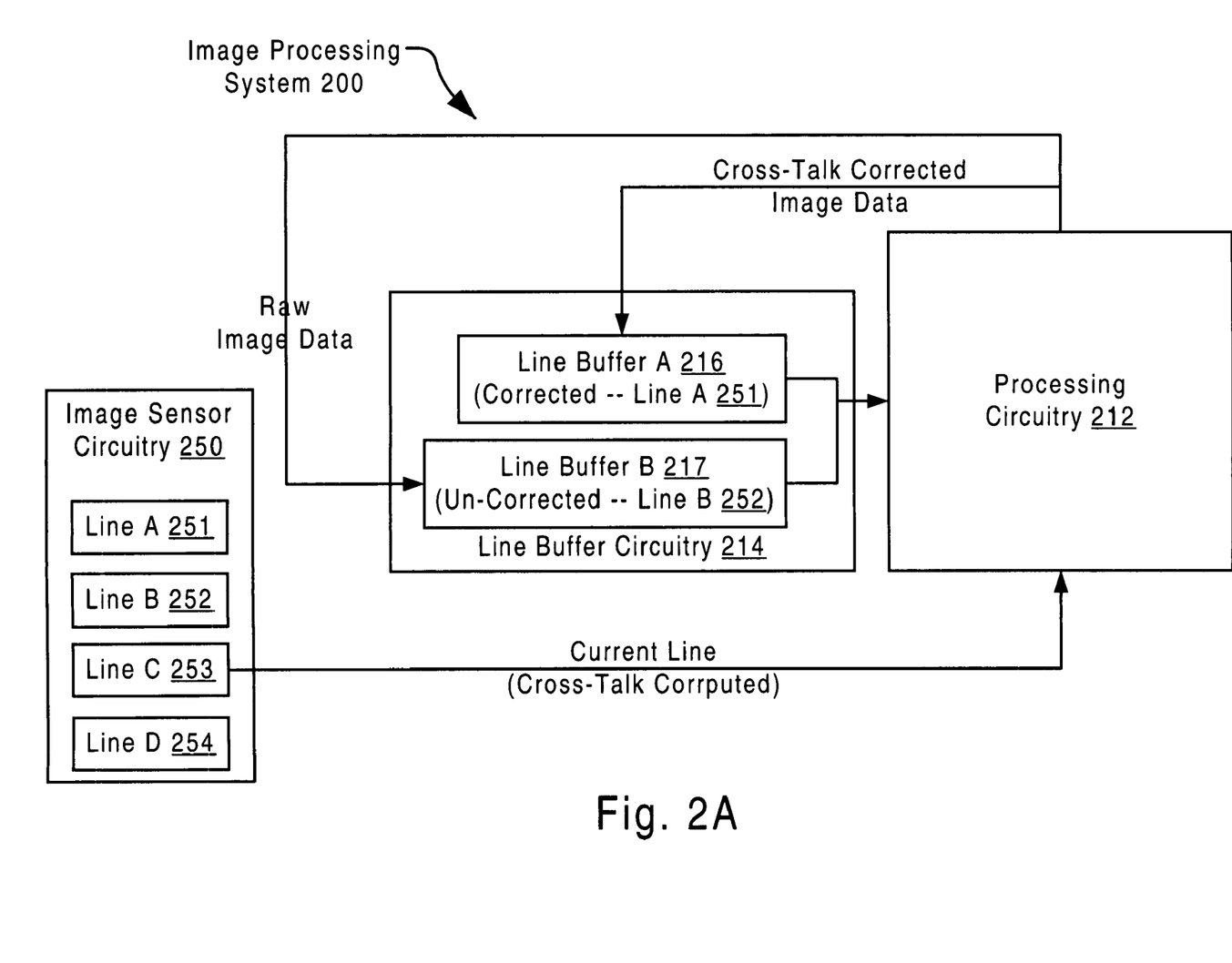
FIG. 2A is a system diagram illustrating another embodiment of an image processing system at a particular instant in time.

FIG. 2A is a system diagram illustrating another embodiment of an image processing system 200 at a particular instant in time. The image processing system 200 may have an image sensor circuitry 250, a line buffer circuitry 214, and a processing circuitry 212. The image sensor circuitry 250 may be operable to read an indefinite number of lines in an image as shown by a line A 251, a line B 252, a line C 253, and a line D 254. The line buffer circuitry 214 itself contains, at least, a line buffer A 216 and a line buffer B 217.

A single line (line C 253 in this Figure) is provided to the processing circuitry 212. This line is presently the raw image data that is read by the image sensor circuitry 250 and itself probably contains cross talk corruption from adjacent pixels. The processing circuitry 212 feeds a previously read line of raw image data into the line buffer B 217. The previously read line of raw image data in this Figure is shown to be the line B 252. A previously read and corrected line of image data is fed into the line buffer A 216. This cross talk corrected line is shown to be the line A 251. In the event that the current line read is the first line of the image (e.g., the line A 251), then the processing circuitry simply loads zeroes into the line buffer A 216. The invention is operable to perform cross talk correction even when there is no data provided from preceding or adjacent lines and pixels without suffering any catastrophic, operational, or mathematical errors. Boundaries conditions (i.e., edge of an image) are handled identically except zeroes are loaded into the line buffers instead of preceding or adjacent line and pixel values. The processing circuitry 212 is operable to perform mathematical processing on the line B 252 using the cross talk corrected image data from the line A 251. The processing circuitry 212 is operable to perform basic mathematical operations such as multiplication, addition, division, subtraction, as well as linear algebra operations which are used in certain embodiments of the invention when multi-pass cross talk correction and large grid sizes are used as will be shown below.

Figure 2B:
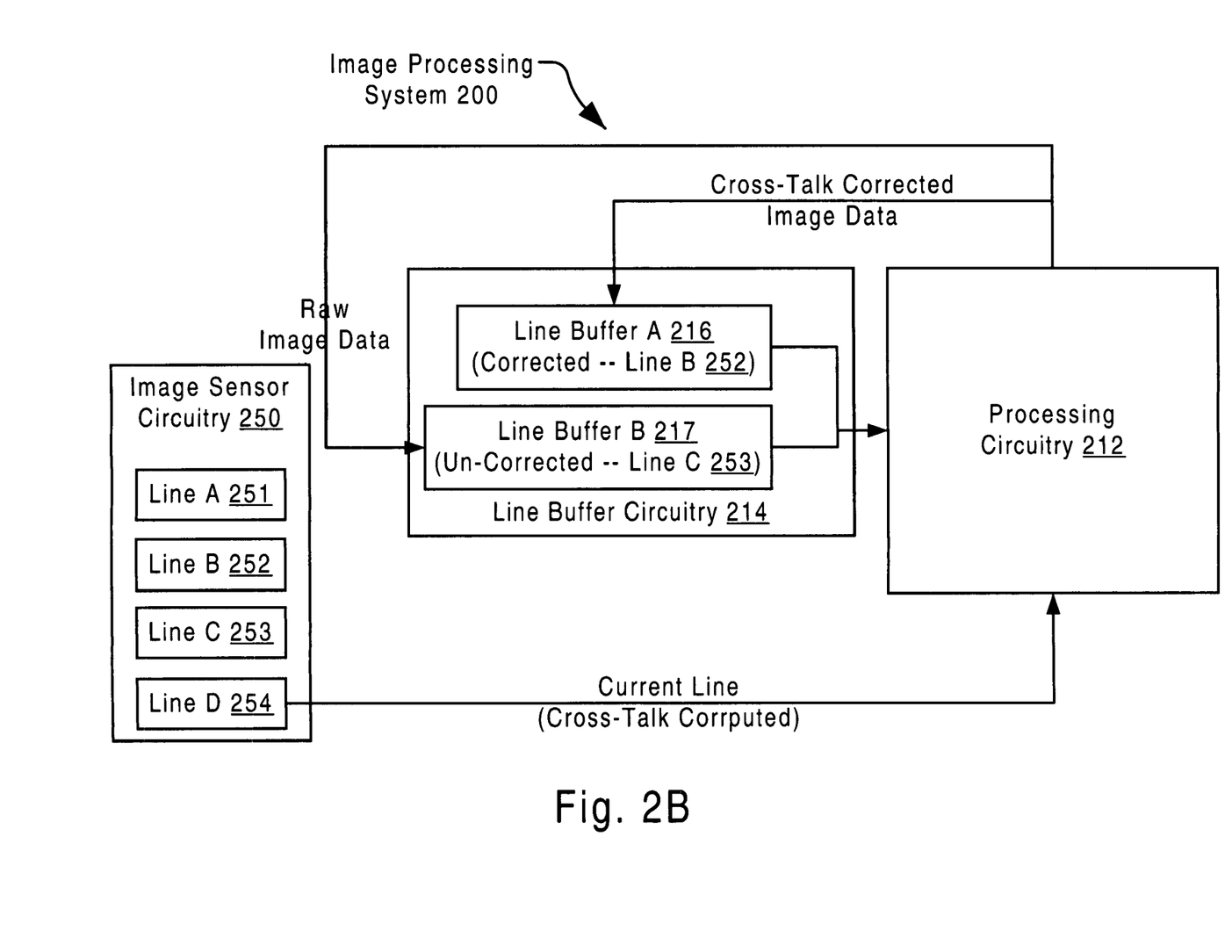
FIG. 2B is a system diagram illustrating the embodiment of the image processing system shown in FIG. 2A at another instant in time.

FIG. 2B is a system diagram illustrating the embodiment of the image processing system 200 shown within the FIG. 2A at another instant in time. Similar to the FIG. 2A, the image processing system 200 may have an image sensor circuitry 250, a line buffer circuitry 214, and a processing circuitry 212. The image sensor circuitry 250 may be operable to read an indefinite number of lines in an image as shown by a line A 251, a line B 252, a line C 253, and a line D 254. The line buffer circuitry 214 itself contains, at least, a line buffer A 216 and a line buffer B 217.

A single line (line D 254 in this Figure) is provided to the processing circuitry 212. This line is presently the raw image data that is read by the image sensor circuitry 250 and itself probably contains cross talk corruption from adjacent pixels. The processing circuitry 212 feeds a previously line of raw image data into the line buffer B 217. The previously read line of raw image data in this Figure is the line C 253 that is read in the FIG. 2A. A previously read and corrected line of image data is fed into the line buffer A 216. This cross talk corrected line is the line B 252 that is corrected in the FIG. 2A. The processing circuitry 212 is operable to perform mathematical processing on the line C 253 using the cross talk corrected image data from the line B 252 in this single pass embodiment of the invention. The processing circuitry 212 may be operable to perform basic mathematical operations such as multiplication, addition, division, subtraction, as well as linear algebra operations that are used in certain embodiments of the invention when multi-pass cross talk correction and large grid sizes are used.

Figure 3A:
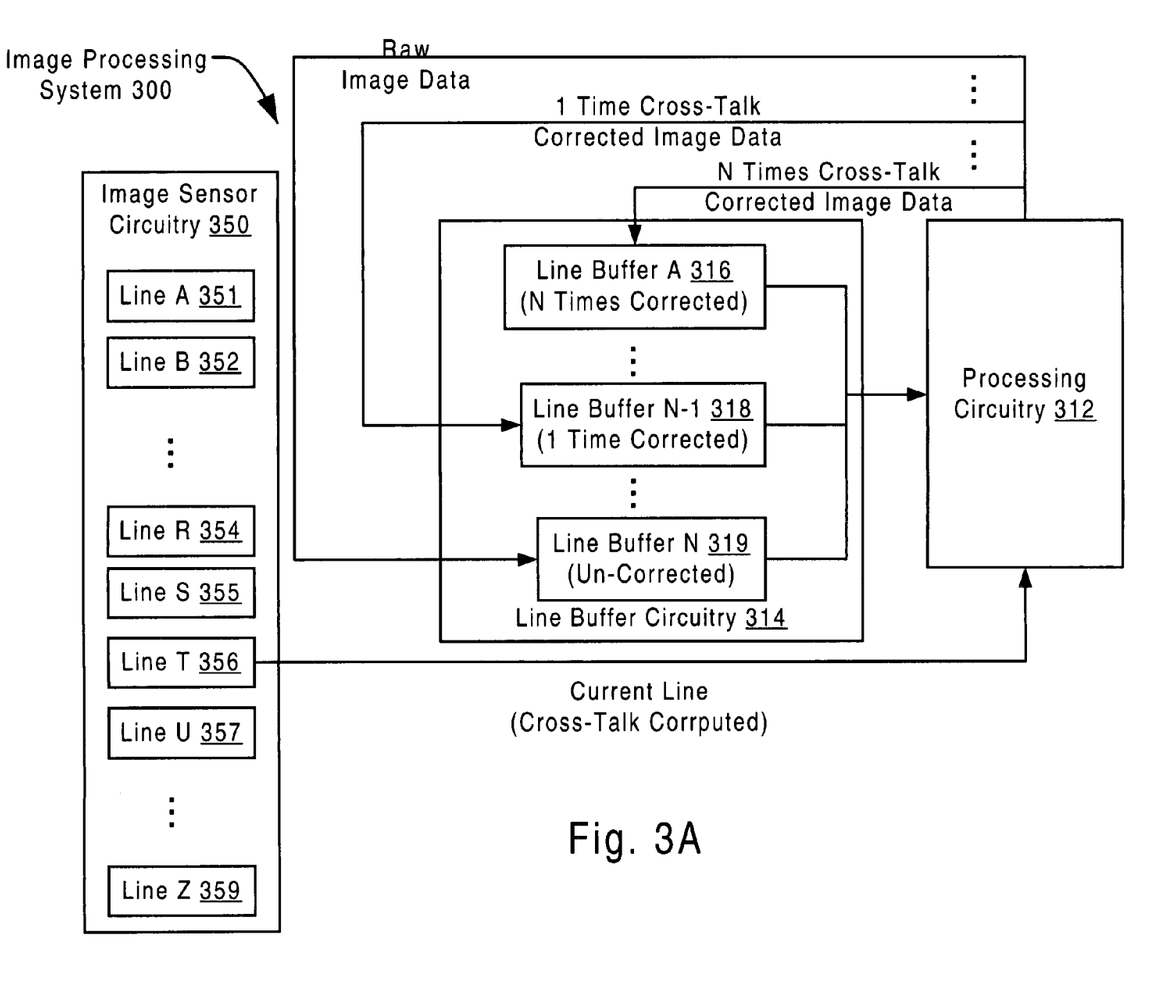
FIG. 3A is a system diagram illustrating another embodiment of an image processing system at another instant in time.

FIG. 3A is a system diagram illustrating another embodiment of an image processing system 300 at another instant in time. The image processing system 300 may have an image sensor circuitry 350, a line buffer circuitry 314, and a processing circuitry 312. The image sensor circuitry 350 is operable to read an indefinite number of lines in an image as shown by a line A 351, a line B 352, . . . , a line R 354, a line S 355, a line T 356, a line U 357, . . . , and a line Z 359. The line buffer circuitry 314 may also contain an indefinite number of line buffers shown as line buffer A 316, . . . , a line buffer N−1 318, . . . , and a line buffer N 319.

Line T 356 is presently the raw image data that is read by the image sensor circuitry 350 and probably contains cross talk corruption from adjacent pixels. The processing circuitry 312 feeds a previously read line of raw image data into the line buffer N 319. A previously read and one time cross talk corrected line of image data in this Figure is shown to be fed into the line buffer N−1 318. Similarly, previously read and N times cross talk corrected line of image data in this Figure is shown to be fed into the line buffer A 316. Any variable grid size is employed to perform the correction of cross talk, as will be shown in even greater detail in the following Figures.

The multi-pass cross talk correction is employed such that a one time cross talk corrected line is located in the line buffer N−1 318, and an N times cross talk corrected line is located in the line buffer A 316. The multi-pass solution is operable such that when one pixel is cross talk corrected, additional pixels along a predetermined trajectory within the digital image are also operable to be cross talk corrected as well. These additional pixels along the predetermined trajectory are cross talk corrected a 2nd, 3rd, etc. time, i.e., an Nth time.

The processing circuitry 312 is operable to perform mathematical processing on a line contained within the line buffer N 319 in this multi-pass embodiment of the invention. The processing circuitry 312 is operable to perform basic mathematical operations such as multiplication, addition, division, subtraction, as well as linear algebra operations employed to perform multi-pass cross talk correction and variable grid sizes.

Figure 3B:
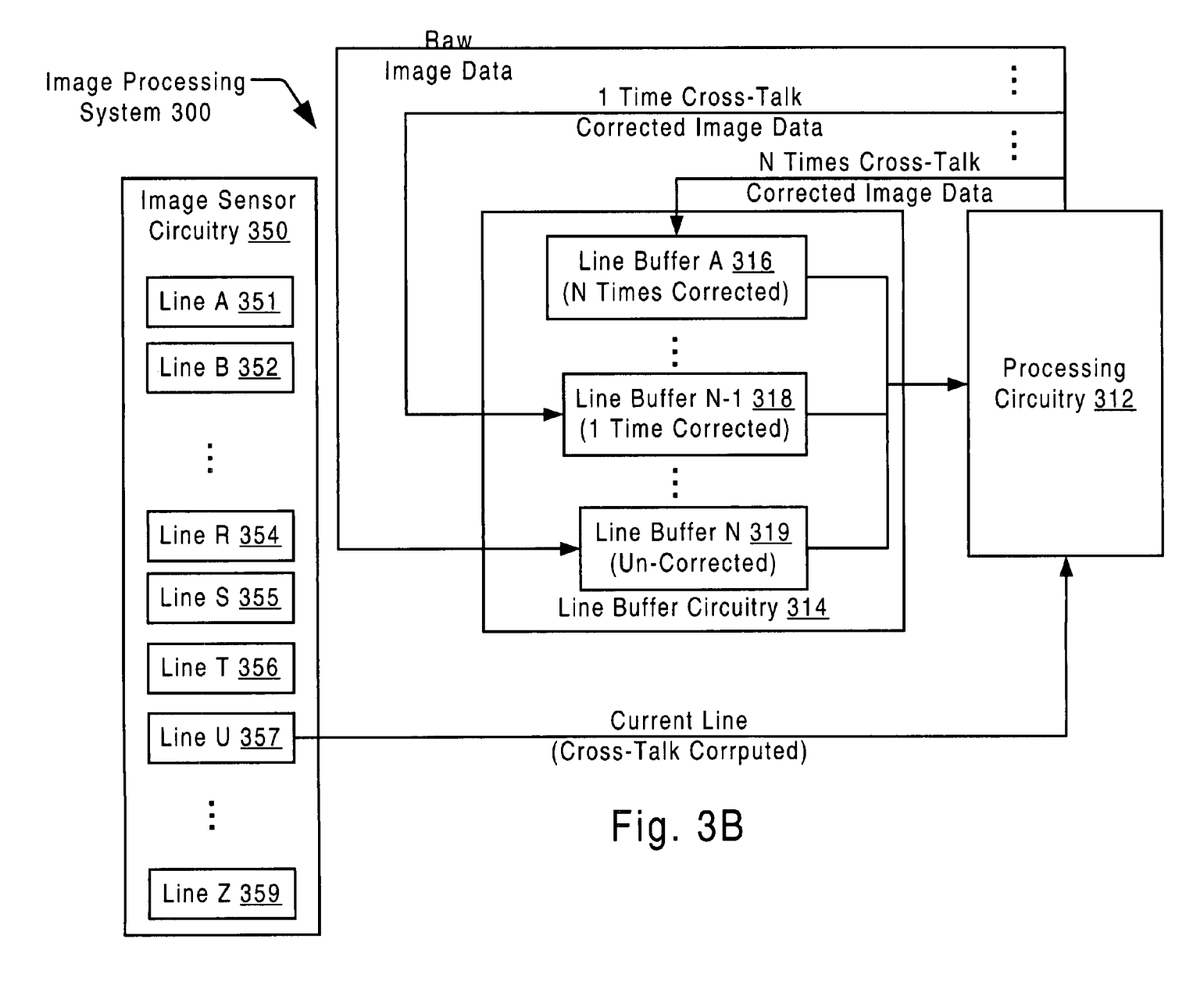
FIG. 3B is a system diagram illustrating the embodiment of the image processing system shown in FIG. 3A at another instant in time.

FIG. 3B is a system diagram illustrating the embodiment of the image processing system 300 shown in FIG. 3A at another instant in time. Similar to the FIG. 3A, the image processing system 300 may have an image sensor circuitry 350, a line buffer circuitry 314, and a processing circuitry 312. The image sensor circuitry 350 is operable to read an indefinite number of lines in an image as shown by a line A 351, a line B 352, . . . , a line R 354, a line S 355, a line T 356, a line U 357, . . . , and a line Z 359. The line buffer circuitry 314 may contain an indefinite number of line buffers shown as line buffer A 316, . . . , a line buffer N−1 318, . . . , and a line buffer N 319.

A single line (now line U 357 in this Figure) is provided to the processing circuitry 312. This line is presently the raw image data that is read by the image sensor circuitry 350 and may contain cross talk corruption from adjacent pixels. The processing circuitry 312 feeds a previously one time cross talk corrected line of raw image data into the line buffer N−1 318. Depending on the grid size, additional one time cross talk corrected line of raw image data into the line buffers adjacent to the line buffer N−1 318. Previously read and N times corrected lines of image data are fed into the line buffer A 316. Similarly, depending on the grid size, additional N times cross talk corrected lines of raw image data into the line buffers adjacent to the line buffer A 316.

The processing circuitry 312 is operable to perform mathematical processing on a line of the image data in this multi-pass embodiment of the invention. The processing circuitry 312 is operable to perform basic mathematical operations such as multiplication, addition, division, subtraction, as well as linear algebra operations that are used in multi-pass cross talk correction and also when large grid sizes are used to perform cross talk correction.

Figure 4A:
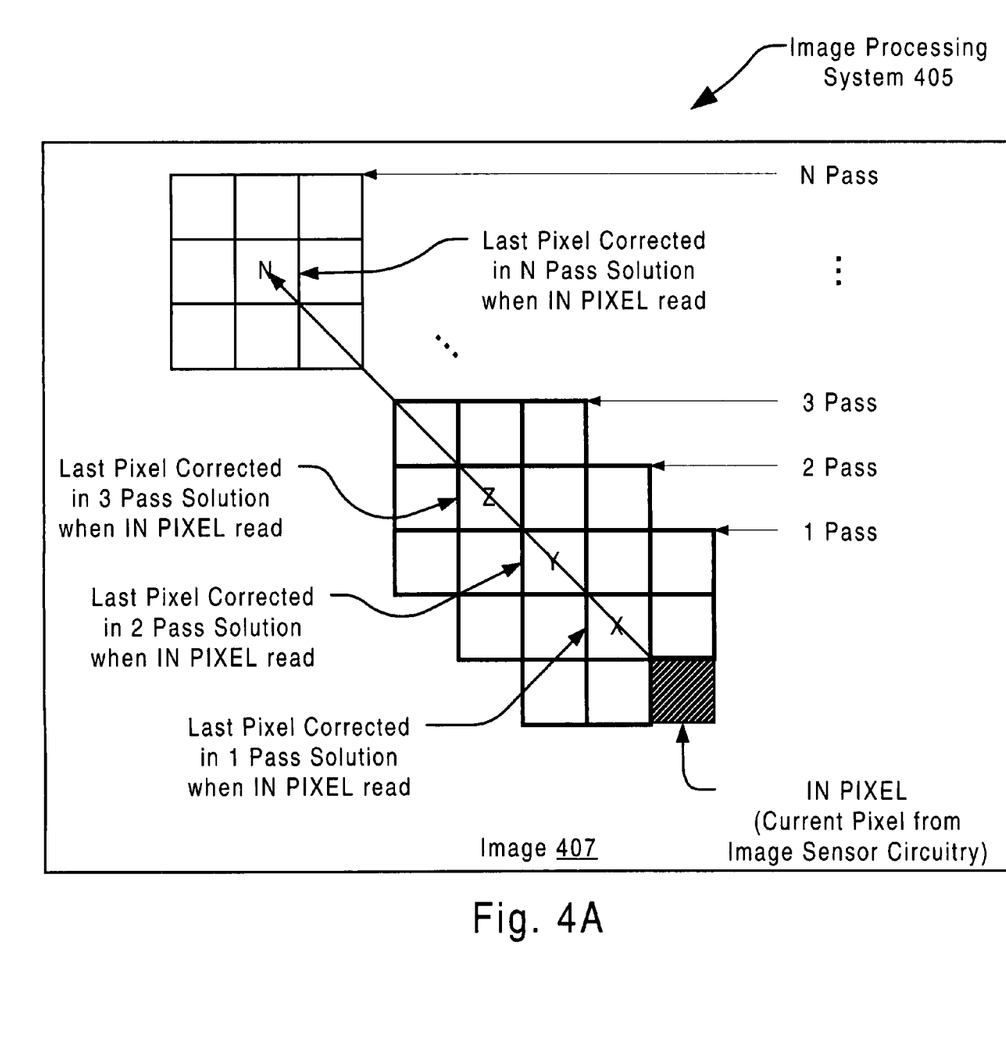
FIG. 4A is a digital image diagram illustrating an embodiment of image processing performed along a predetermined trajectory by an image processing system.

FIG. 4A is a digital image diagram illustrating an embodiment of image processing performed along a predetermined trajectory by an image processing system 405. An image 407 contains an indefinite number of pixels. The grid sizes employed in the FIG. 4A are exemplary of just one of the many various grid sizes that are each operable to perform cross talk correction and is also shown in FIG. 4D. An IN PIXEL is input from an image sensor circuitry and an X PIXEL (located immediately to the left one pixel and up one pixel from the IN PIXEL) is cross talk corrected. In a single pass solution, the X PIXEL is the last pixel corrected when the IN PIXEL is read. Moreover, when multi-pass solutions are implemented, a Y PIXEL (located immediately to the left one pixel and up one pixel from the X PIXEL) is cross talk corrected at least one time more than the X PIXEL. For example, in the two pass solution, the Y PIXEL is the last pixel corrected when the IN PIXEL is read.

When multi-pass solutions are implemented, a Z PIXEL (located immediately to the left one pixel and up one pixel from the Y PIXEL) is cross talk corrected at least one time more than the Y PIXEL. In a three pass solution, the Z PIXEL is the last pixel corrected when the IN PIXEL is read. Similarly, the invention is indefinitely scaleable to accommodate any number of passes in various multi-pass solutions. When multi-pass solutions are implemented, an N PIXEL (along the predetermined trajectory defined along the X PIXEL, the Y PIXEL, and the Z PIXEL) is cross talk corrected. In an indefinite N- pass solution, the N PIXEL is the last pixel corrected when the IN PIXEL is read.

The predetermined trajectory may be employed to perform cross talk correction to each of the pixels along the predetermined trajectory. Even in the single pass solution, a predetermined trajectory exists by the choosing of which preceding pixel is going to be cross talk corrected when the IN PIXEL is read. Moreover, different grid sizes are operable while still performing cross talk correction along the predetermined trajectory as shown in the FIG. 4A. For example, each of the X PIXEL, the Y PIXEL, and the Z PIXEL, is a cluster of pixels in certain embodiments of the invention, and a specific pixel within each of the clusters when cross talk is corrected. That is to say, a predetermined number of lines is used for cross talk correction in each of the passes of the multi-pass embodiments of the invention.

Figure 4B:
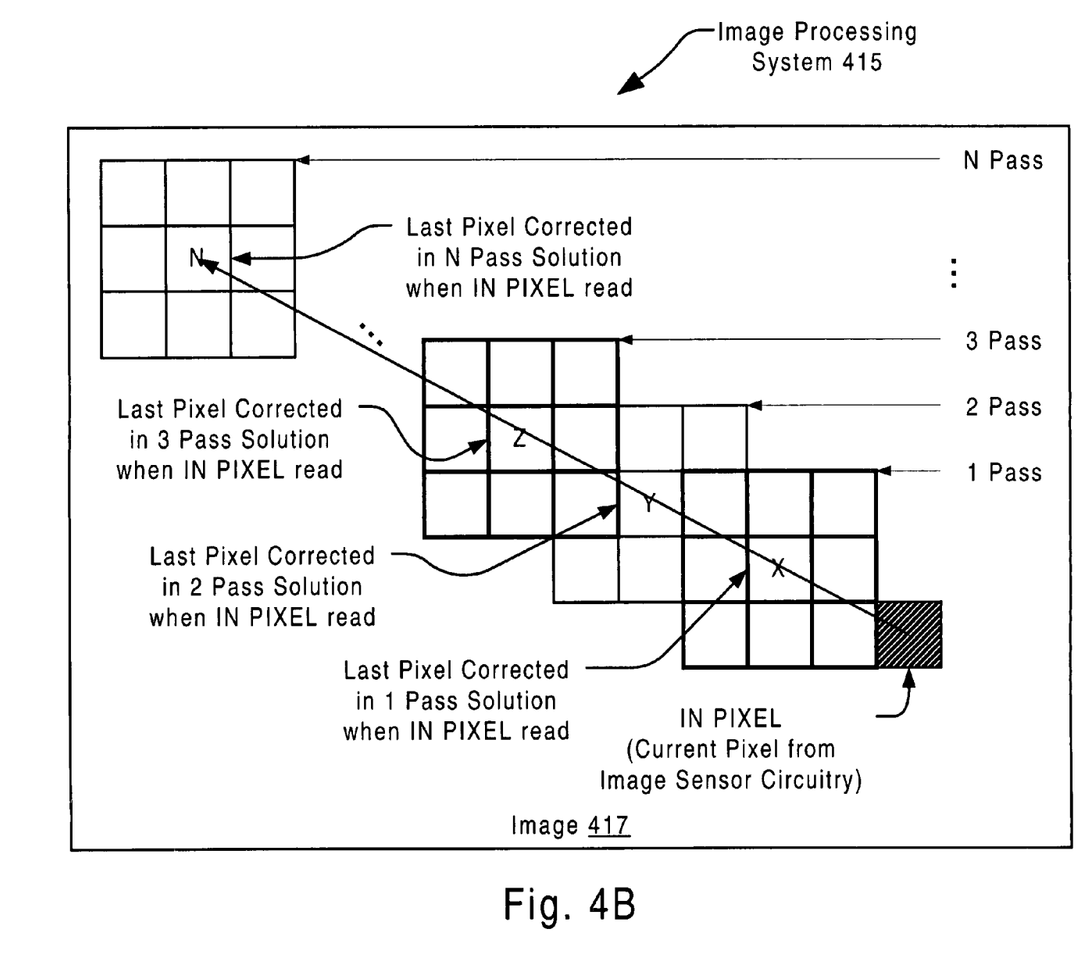
FIG. 4B is a digital image diagram illustrating another embodiment of image processing performed along another predetermined trajectory by an image processing system.

FIG. 4B is a digital image diagram illustrating another embodiment of image processing performed along another predetermined trajectory by an image processing system 415. The FIG. 4B contains image 417 with an indefinite number of pixels. Similar to the FIG. 4A, the grid sizes employed in the FIG. 4B are exemplary of just one of the many various grid sizes that are each operable to perform cross talk correction and is shown in FIG. 4D below. An IN PIXEL is input from an image sensor circuitry and an X PIXEL (located to the left two pixels and up one pixel from the IN PIXEL) is cross talk corrected. In a single pass solution, the X PIXEL is the last pixel corrected when the IN PIXEL is read. When multi-pass solutions are implemented, a Y PIXEL (located to the left two pixels and up one pixel from the X PIXEL) is cross talk corrected at least one time more than the X PIXEL. For example, in the two pass solution, the Y PIXEL is the last pixel corrected when the IN PIXEL is read.

When multi-pass solutions are implemented, a Z PIXEL (located to the left two pixels and up one pixel from the Y PIXEL) is cross talk corrected at least one time more than the Y PIXEL. For example, in a three pass solution, the Z PIXEL is the last pixel corrected when the IN PIXEL is read. Similarly, the invention is indefinitely scaleable to accommodate any number of passes in various multi-pass solutions. When multi-pass solutions are implemented, an N PIXEL (along the predetermined trajectory defined along the X PIXEL, the Y PIXEL, and the Z PIXEL) is cross talk corrected. For example, in an indefinite N-pass solution, the N PIXEL is the last pixel corrected when the IN PIXEL is read.

If desired, the predetermined trajectory is also adaptable to be along a trajectory of pixels being located immediately to the left one pixel and up two pixels from a preceding pixel along the predetermined trajectory. These various examples of the predetermined trajectory are included to illustrate the adaptability of the invention to perform cross talk correction of various pixels at various times within the image 417. In addition, similar to the description with respect to the FIG. 4A, different grid sizes are operable while still performing cross talk correction along the predetermined trajectory as shown in FIG. 4B.

Figure 4C:
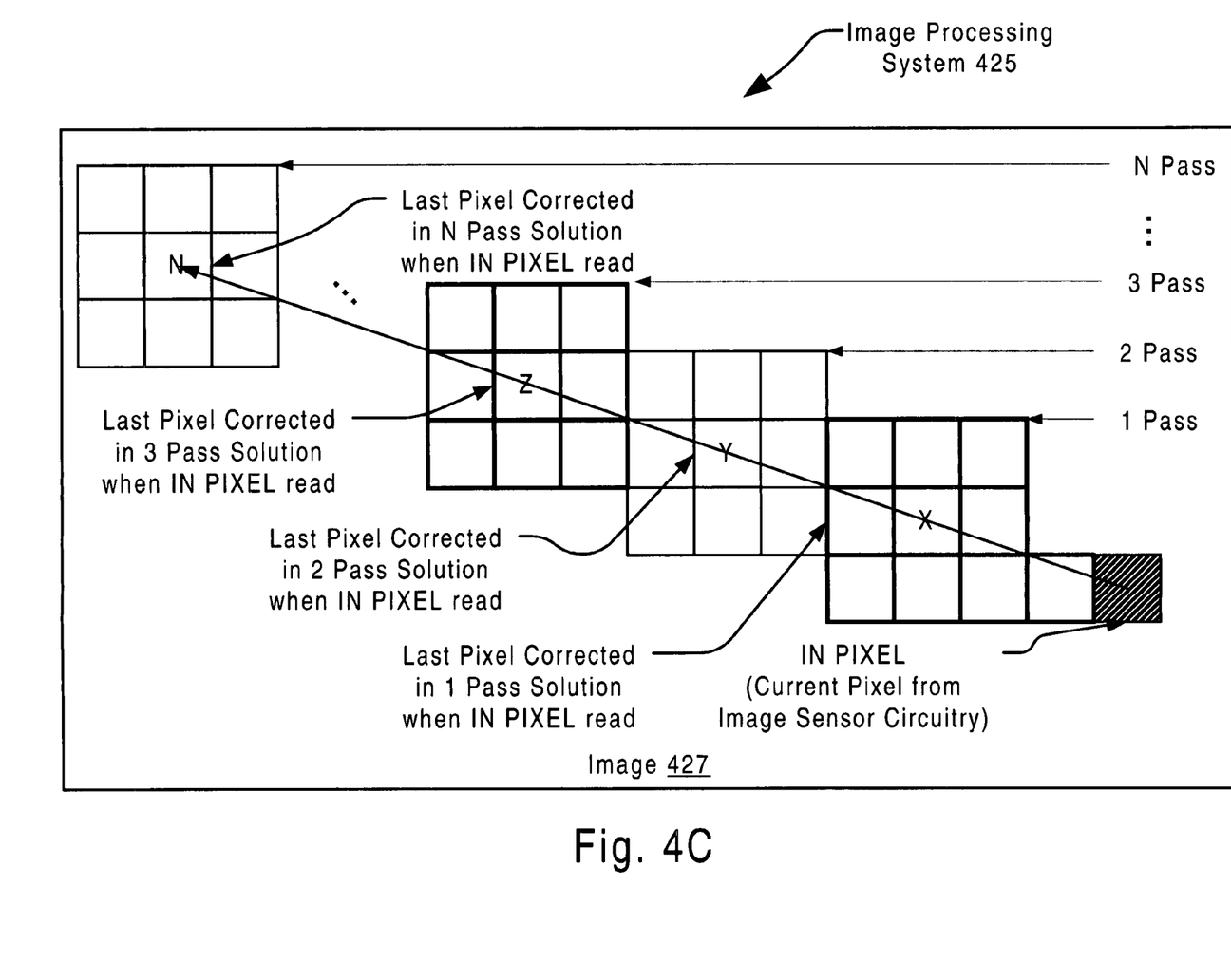
FIG. 4C is a digital image diagram illustrating another embodiment of image processing performed along yet another predetermined trajectory by an image processing system.
Figure 4D:
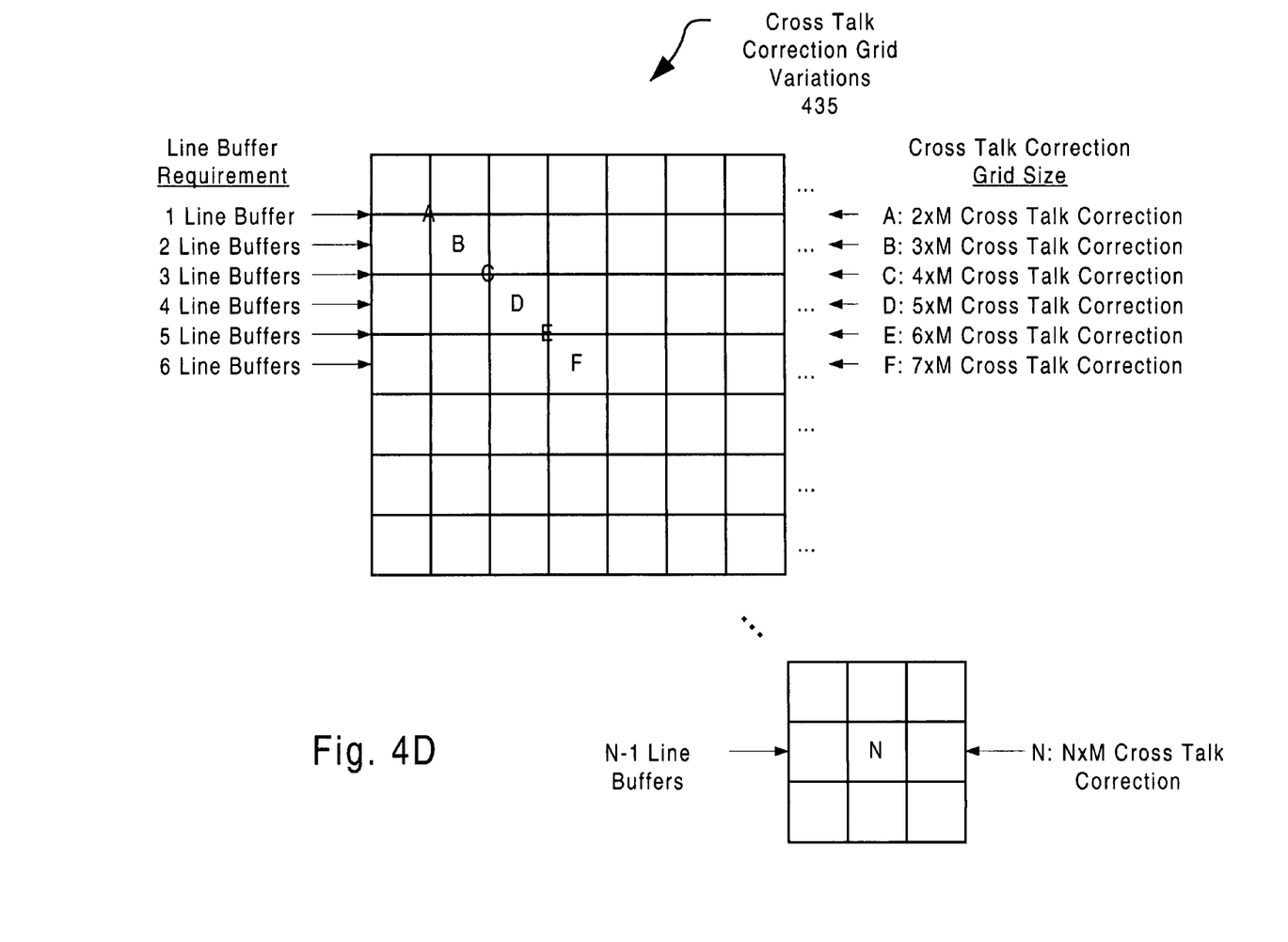
FIG. 4D is a digital image diagram illustrating various embodiments of grid sizes that are used to perform cross talk correction, independent of the number of passes performed for cross talk correction.

FIG. 4C is a digital image diagram illustrating another embodiment of image processing performed along yet another predetermined trajectory by an image processing system 425. The FIG. 4C contains image 427 with an indefinite number of pixels. Similar to the FIG. 4A and the FIG. 4B, the grid sizes employed in the FIG. 4C are exemplary of just one of the many various grid sizes that are each operable to perform cross talk correction and is also shown in FIG. 4D. An IN PIXEL is input from an image sensor circuitry and an X PIXEL (located to the left three pixels and up one pixel from the IN PIXEL) is cross talk corrected. In a single pass solution, the X PIXEL is the last pixel corrected when the IN PIXEL is read. When multi-pass solutions are implemented, a Y PIXEL (located to the left three pixels and up one pixel from the X PIXEL) is cross talk corrected at least one time more than the X PIXEL. For example, in the two pass solution, the Y PIXEL is the last pixel corrected when the IN PIXEL is read.

When multi-pass solutions are implemented, a Z PIXEL (located to the left three pixels and up one pixel from the Y PIXEL) is cross talk corrected at least one time more than the Y PIXEL. For example, in a three pass solution, the Z PIXEL is the last pixel corrected when the IN PIXEL is read. Similarly, the invention is indefinitely scaleable to accommodate any number of passes in various multi-pass solutions. When multi-pass solutions are implemented, an N PIXEL (along the predetermined trajectory defined along the X PIXEL, the Y PIXEL, and the Z PIXEL) is cross talk corrected. For example, in an indefinite N-pass solution, the N PIXEL is the last pixel corrected when the IN PIXEL is read.

If desired, the predetermined trajectory is also adaptable to be along a trajectory of pixels being located immediately to the left one pixel and up three pixels from a preceding pixel along the predetermined trajectory. These various examples of the predetermined trajectory are included to illustrate the adaptability of the invention to perform cross talk correction of various pixels at various times within the image 427. In addition, similar to the description of FIGS. 4A and 4B, different grid sizes may be operable while still performing cross talk correction along the predetermined trajectory as shown in FIG. 4C.

FIG. 4D is a digital image diagram illustrating various embodiments of grid sizes 435 that are used to perform cross talk correction, independent of the number of passes performed for cross talk correction. The number of passes used to perform cross talk correction in the various multi-pass embodiments of the invention is independently variable from the number of passes performed. FIG. 4D shows the instances when cross talk is not corrected on a pixel, but rather a location between pixels. For example, position A, position C, and position E are all exemplary of how it need not be a pixel itself that is being cross talk corrected, but rather a location between pixels.

In the illustration shown in FIG. 40, position A employs a 2×M grid size to perform cross talk correction, where M is an integer. A single line buffer may be required to perform this operation. The grid size 2×M is an indefinitely scaleable rectangle where the height of the rectangle is 2 lines of image data. Similarly, position C employs a 4×M grid size to perform cross talk correction. Three line buffers may be required to perform this operation. The grid size 4×M is an indefinitely scaleable rectangle where the height of the rectangle is 4 lines of image data. Similarly, position E employs a 6×M grid size to perform cross talk correction. Five line buffers may be required to perform this operation. The grid size 6×M is an indefinitely scaleable rectangle where the height of the rectangle may be 6 lines of image data.

For cross talk correction performed on actual pixels within the image, as shown in FIG. 4D, the pixel B employs a 3×M grid size to perform cross talk correction. Two line buffers may be required to perform this operation. The grid size 3×M is an indefinitely scaleable rectangle where the height of the rectangle is 3 lines of image data. Similarly, the pixel D employs a 5×M grid size to perform cross talk correction. Four line buffers may be required to perform this operation. The grid size 5×M may be an indefinitely scaleable rectangle where the height of the rectangle is 5 lines of image data. Similarly, the pixel F employs a 7×M grid size to perform cross talk correction. Six line buffers may be required to perform this operation. The grid size 7×M is an indefinitely scaleable rectangle where the height of the rectangle is 7 lines of image data.

Also shown in FIG. 4D, a pixel or position N employs an N×M grid size to perform cross talk correction. N−1 line buffers are required to perform this operation. The grid size N×M is an indefinitely scaleable rectangle where the height of the rectangle is N lines of image data. Various grid sizes may be operable with various number of passes performed in the multi-pass solutions.

Figure 5A:
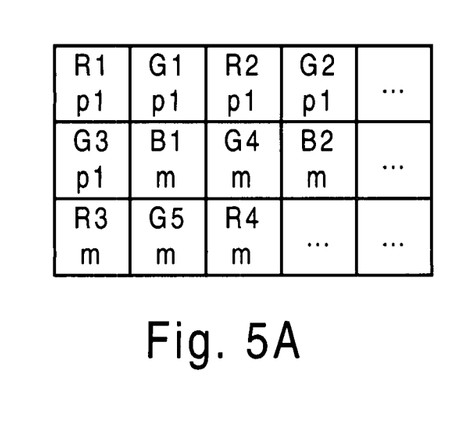
FIG. 5A is a digital image diagram illustrating a cross section of a digital image on which single pass cross talk correction is performed when a specific pixel within the digital image is read.

FIG. 5A is a digital image diagram illustrating a cross section snapshot 500 of a digital image on which single pass cross talk correction is performed when a specific pixel within the digital image is read. In FIG. 5A, when the pixel location R4 is read, it is the pixel location G3 (shown as the single time cross talk corrected pixel G3p1) that is cross talk corrected. For example, the measured value (R4m) is read by an image sensor circuitry, and the measured value (G3m) contains some undesirable cross talk corruption, the cross talk is corrected resulting in the cross talk corrected pixel (G3p1).

Figure 5B:
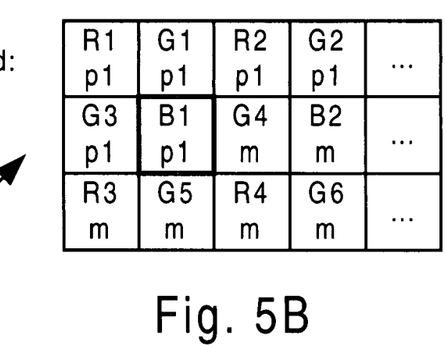
FIG. 5B is a digital image diagram illustrating the cross section of the digital image on which single pass cross talk correction is performed as shown in the FIG. 5A when a subsequent pixel within the digital image is read.

FIG. 5B is a digital image diagram illustrating the cross section snapshot 502 of the digital image on which single pass cross talk correction is performed as shown in FIG. 5A when a subsequent pixel within the digital image is being read. In FIG. 5B, when the pixel location G6 is read, it is the pixel location B1 (shown as the single time cross talk corrected pixel B1p1) that is cross talk corrected. It is the pixel location G3 (shown as G3p1) that has been cross talk corrected in the previous snapshot as shown in FIG. 5A. For example, the measured value (G6m) is what is actually being read by an image sensor circuitry, and the measured value (B1m) itself contains some undesirable cross talk corruption is cross talk corrected. The pixel location B1, having been cross talk corrected, is shown as (B1p1) indicating a single pass cross talk correction solution.

Figure 5C:
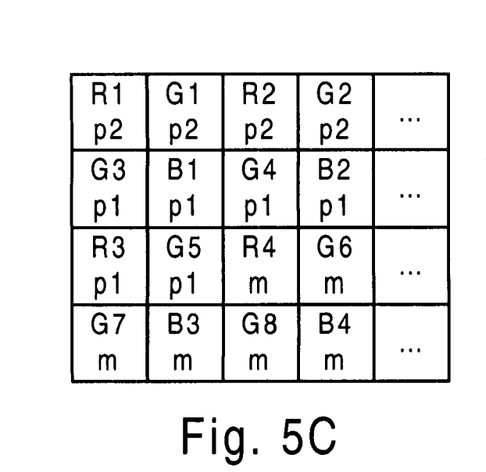
FIG. 5C is a digital image diagram illustrating a cross section of a digital image on which multi-pass cross talk correction is performed when a specific pixel within the digital image is being read.

FIG. 5C is a digital image diagram illustrating a cross section snapshot 504 of a digital image on which multi-pass cross talk correction is performed when a specific pixel within the digital image is read. In FIG. 5C, when the pixel location B4 is read, it is the pixel location G5 (shown as the single time cross talk corrected pixel G5p1) that is cross talk corrected. For example, the measured value (B4m) is read by the image sensor circuitry, and the measured value (G5m)

contains some undesirable cross talk corruption that is cross talk corrected to become the cross talk corrected pixel (G5p1).

Figure 5D:
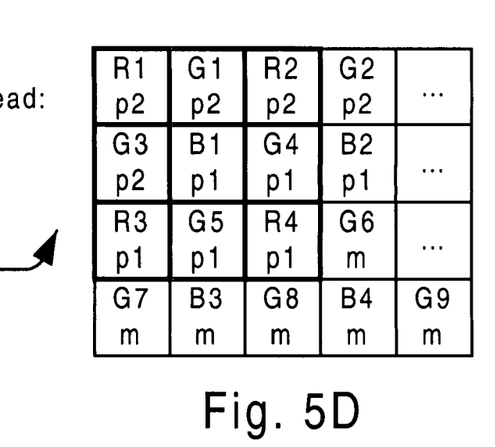
FIG. 5D is a digital image diagram illustrating the cross section of the digital image on which multi-pass cross talk correction is performed as shown in the FIG. 5C when a subsequent pixel within the digital image is read.

FIG. 5D is a digital image diagram illustrating the cross section snapshot 506 of the digital image on which multi-pass cross talk correction is performed as shown in FIG. 5C when a subsequent pixel within the digital image is read. In FIG. 5D, when the pixel location G9 is read, it is the pixel location R4 (shown as the single time cross talk corrected pixel R4p1) that is cross talk corrected. It is the pixel location G5 (shown as G5p1) that has been cross talk corrected in the previous snapshot as shown in FIG. 5C. For example, the measured value (G9m) is read by the image sensor circuitry, and the measured value (R4m) contains some undesirable cross talk corruption that is cross talk corrected. The pixel location R4, having been cross talk corrected, is shown as (R4p1) indicating a single pass cross talk correction solution.

The various embodiments of the invention shown in FIGS. 5A, 5B, 5C, and 5D show one particular predetermined trajectory where cross talk correction is performed. However, those having skill in the art of digital image processing will appreciate that any of the various predetermined trajectories shown in the various Figures are analogously operable without departing from the scope and spirit of the invention. In addition, those predetermined trajectories that are not explicitly illustrated are also within the scope of the invention.

Figure 6:
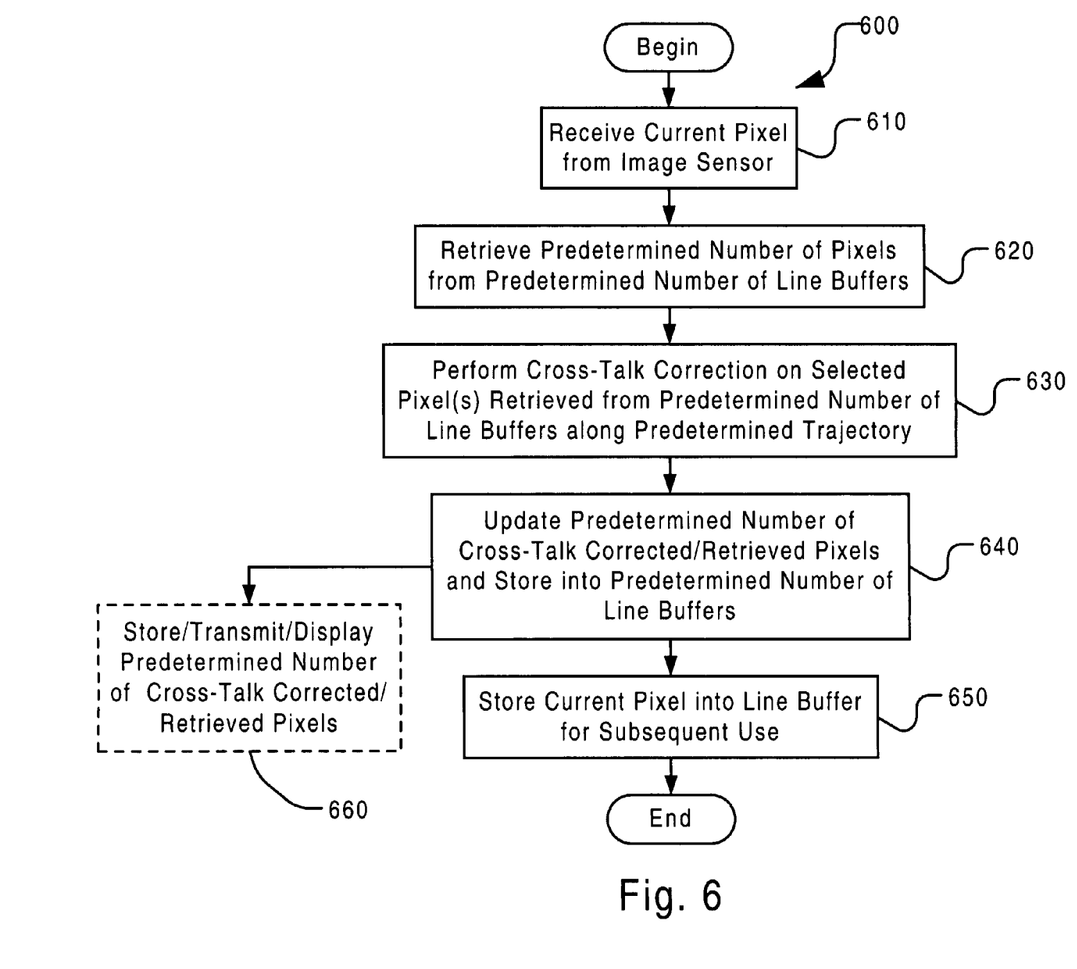
FIG. 6 is a functional block diagram illustrating an embodiment of a cross talk correction method.

FIG. 6 is a functional block diagram illustrating an embodiment of a cross talk correction method 600. In a block 610, a pixel is received from an image sensor. In a block 620, a predetermined number of pixels are retrieved from a predetermined number of line buffers. In block 630, cross talk correction is performed on a selected pixel or a selected number of pixels that is retrieved from a predetermined number of line buffers in the block 620. The cross talk of the pixels is corrected along a predetermined trajectory as shown in FIGS. 4A, 4B, and 4C. In addition, the grid size of the cross talk correction is also variable, as shown in FIG. 4D. In a block 640, the predetermined number of cross talk corrected/retrieved pixels are updated and stored into a predetermined number of line buffers. Within the multi-pass embodiments of the invention, certain pixels along the predetermined trajectory are updated $2^{nd}$, $3^{rd}$, $4^{th}$, etc. times, depending on the number of passes employed in the specific multi-pass embodiment. Those updated values are then stored into the predetermined number of line buffers, so that the cross talk corrected values are usable when performing cross talk correction on subsequent pixels. The ability to use partially cross talk corrected values to perform cross talk correction of other pixels, allows for a high degree of accuracy when compared to conventional methods of cross talk correction.

In an alternate block 660, the predetermined number of cross talk corrected/retrieved pixels may be stored, transmitted, and/or displayed. For example, the cross talk correction method 600 does not require that the entire image be stored in any intermediary memory location, as compared with conventional methods, but the cross talk correction method 600 is operable to allow the cross talk corrected/retrieved pixels to be stored in a location for subsequent use. This type of memory is typically cheaper than the dynamic memory required to perform full image data processing used in conventional image processing systems. In addition, those cross talk corrected/retrieved pixels are operable to be transmitted via local or wide area network. Similarly, the cross talk corrected/retrieved pixels are operable to be displayed using any suitable display system. Finally, in block 650, the current pixel, that is received from the image sensor in the block 610, is stored into a line buffer for subsequent use by other pixels to perform cross talk correction within the digital image.

While various embodiments of the invention have been described, it will be apparent to those of ordinary skill in the art that many more embodiments and implementations are possible that are within the scope of this invention.

What is claimed is:

1. An image processing system operable to perform cross talk correction in a first pass on a digital image arranged in a plurality of lines, the image processing system comprising:
   an image sensor circuitry operable to read an image and generate the digital image based on the image;
   a processing circuitry communicatively coupled to the image sensor circuitry; and
   a line buffer circuitry communicatively coupled to the processing circuitry, the line buffer circuitry comprising a plurality of line buffers;
   wherein the processing circuitry performs cross talk correction on a first pixel during the first pass to generate a first cross talk corrected pixel, wherein said first pixel is contained within a first line comprising a first plurality of pixels, the first line is received from a first line buffer of the plurality of line buffers;
   wherein, during the first pass, the processing circuitry stores the first cross talk corrected pixel in the line buffer circuitry, retrieves the first cross talk corrected pixel from the line buffer circuitry, and uses the first cross talk corrected pixel to perform cross talk correction on a second pixel to generate a second cross talk corrected pixel, wherein the second pixel is contained within a second line comprising a second plurality of pixels, the second line is received from a second line buffer of the plurality of line buffers.

2. The image processing system of claim 1, wherein the processing circuitry stores the second cross talk corrected pixel in the line buffer circuitry, retrieves the second cross talk corrected pixel from the line buffer circuitry, and uses the first cross talk corrected pixel and the second cross talk corrected pixel to perform cross talk correction on a third pixel to generate a third cross talk corrected pixel, wherein the third pixel is contained within a third line comprising a third plurality of pixels, the third line is received from a third line buffer of the plurality of line buffers.

3. The image processing system of claim 2, wherein the first pixel, the second pixel and the third pixel are aligned along a predetermined trajectory.

4. The image processing system of claim 2, wherein the processing circuitry stores the third cross talk corrected pixel in the line buffer circuitry, retrieves the third cross talk corrected pixel from the line buffer circuitry, and uses the first cross talk corrected pixel, the second cross talk corrected pixel and the third cross talk corrected pixel to perform cross talk correction on a fourth pixel to generate a fourth cross talk corrected pixel, wherein the fourth pixel is contained within a fourth line comprising a fourth plurality of pixels, the fourth line is received from a fourth line buffer of the plurality of line buffers.

5. The image processing system of claim 4, wherein the first pixel, the second pixel, the third pixel, and the fourth pixel are aligned along a predetermined trajectory.

6. A method of performing cross talk correction in a first pass on a digital image arranged in a plurality of lines, the method comprising:

performing cross talk correction on a first pixel during the first pass to generate a first cross talk corrected pixel, wherein said first pixel is contained within a first line of the plurality of lines in a line buffer, the first line comprising a first plurality of pixels;

storing the first cross talk corrected pixel in the line buffer during the first pass;

retrieving the first cross talk corrected pixel from the line buffer during the first pass;

using the first cross talk corrected pixel to perform cross talk correction on a second pixel during the first pass to generate a second cross talk corrected pixel, wherein the second pixel is contained within a second line of the plurality of line comprising a second plurality of pixels.

7. The method of claim 6, further comprising:

storing the second cross talk corrected pixel in the line buffer;

retrieving the second cross talk corrected pixel from the line buffer;

using the first cross talk corrected pixel and the second cross talk corrected pixel to perform cross talk correction on a third pixel to generate a third cross talk corrected pixel, wherein the third pixel is contained within a third line of the plurality of line comprising a third plurality of pixels.

8. The method of claim 7, wherein the first pixel, the second pixel and the third pixel are aligned along a predetermined trajectory.

9. The method of claim 6, wherein the first pixel and the second pixel are aligned along a predetermined trajectory.

* * * * *